(12) United States Patent
Polland (10) Patent No.: US 9,210,049 B2
(45) Date of Patent: Dec. 8, 2015

(54) INTELLIGENT INFRASTRUCTURE MANAGEMENT USER DEVICE (71) Applicant: ADC Telecommunications, Inc., Shakopee, MN (US)

(72) Inventor: Joseph Polland, Eden Prarie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 248 days.

(21) Appl. No.: 13/683,866

(22) Filed: Nov. 21, 2012

(65) Prior Publication Data
US 2013/0128758 A1 May 23, 2013

Related U.S. Application Data (60) Provisional application No. 61/562,444, filed on Nov. 22, 2011.

(51) Int. Cl.
H04L 12/24 (2006.01)
H04L 12/26 (2006.01)

(52) U.S. Cl.
CPC ............... *H04L 41/22* (2013.01); *H04L 41/24* (2013.01); *H04L 43/0811* (2013.01); *H04L 43/0817* (2013.01)

(58) Field of Classification Search
CPC .................................................. H04L 43/0811
See application file for complete search history.

(56) References Cited

U.S. PATENT DOCUMENTS 6,784,802 B1 8/2004 Stanescu
7,289,436 B2 10/2007 Schaller et al.
2004/0065470 A1 4/2004 Goodison et al.
2006/0047800 A1 3/2006 Caveney et al.
2006/0160395 A1 7/2006 Macauley et al.
2006/0234564 A1* 10/2006 Pharn et al. .................. 439/676

(Continued)

FOREIGN PATENT DOCUMENTS

EP 1796403 12/2006
WO 2005018150 2/2005

OTHER PUBLICATIONS

New Zealand Intellectual Property Office, "First Examination Report from NZ Application No. 625385 mailed Nov. 6, 2014", "from Foreign Counterpart of U.S. Appl. No. 13/683,866", Nov. 6, 2014, pp. 1-2, Published in: NZ.

(Continued)

*Primary Examiner* — Huy D Vu
*Assistant Examiner* — Teisha D Hall
(74) *Attorney, Agent, or Firm* — Fogg & Powers LLC (57) ABSTRACT An infrastructure management device comprises a processor configured to obtain port status and networking device status for each of one or more physicals networking devices in a system. The device also comprises a display unit coupled to the processor and configured to display one or more virtual networking devices, and a user input element configured to provide user input to the processor. The port status indicates that a cable is inserted into the first port and the processor obtains cable data identifying one or more characteristics of the cable inserted into the first port. The processor is configured to compare the one or more characteristics of the cable inserted into the first port with one or more characteristics defined in the work order. The processor is configured to provide a notification to a user indicating whether the one or more characteristics of the inserted cable comply with the work order.

24 Claims, 9 Drawing Sheets (56) References Cited

U.S. PATENT DOCUMENTS

2006/0288159 A1*  12/2006  Haruna et al. ............... 711/113
2007/0288159 A1   12/2007  Skelton
2008/0049627 A1    2/2008  Nordin
2011/0244698 A1   10/2011  Jacks et al.
2014/0111346 A1*   4/2014  Pinn et al. ................. 340/691.6

OTHER PUBLICATIONS

International Searching Authority, "International Search Report", "from Foreign Counterpart of U.S. Appl. No. 13/683,866", Feb. 20, 2013, pp. 1-11.

The International Bureau of WIPO, "International Preliminary Report on Patentability from PCT Application No. PCT/US2012/066366 mailed Jun. 5, 2014", "from PCT Counterpart of U.S. Appl. No. ", Jun. 5, 2014, pp. 1-8, Published in: WO.

European Patent Office, "Extended European Search Report for Application No. 12852010.3", "from Foreign Counterpart to U.S. Appl. No. 13/683,866", Jun. 24, 2015, pp. 1-8, Published in: EP.

"The SYSTIMAX iPATCH System Panel Manager Guide", Jun. 2009, pp. 1-87, Publisher: CommScope.

New Zealand Patent Office, "Office Action for NZ Application No. 625385", "from Foreign Counterpart to U.S. Appl. No. 13/683,866", Sep. 16, 2015, pp. 14, Published in: NZ.

Chile Patent Office, "Office Action for CL Application No. 1343-14", "from Foreign Counterpart to U.S. Appl. No. 13/683,866", Recd Oct. 9, 2015, pp. 17, Published in: CL.

* cited by examiner

INTELLIGENT INFRASTRUCTURE MANAGEMENT USER DEVICE

CROSS-REFERENCE TO RELATED APPLICATIONS

This application is related to and claims priority to U.S. Provisional Patent Application Ser. No. 61/562,444 filed on Nov. 22, 2011, which is hereby incorporated herein by reference.

BACKGROUND

Businesses and organizations worldwide are becoming more dependent upon networks that operate over a broadly distributed physical infrastructure layer. Such networks can be comprised of a relatively large number of cables and connections. For example, some such networks have up to hundreds of millions of cables and connections. The reliability or fallibility of these networks is dependent upon many factors, including comprehensive and accurate status and documentation, and the ability of network personnel to isolate, troubleshoot, and repair failures. As the number of cables and connections increases, the ability of network personnel to accurately install and manage correct connections becomes increasing difficult.

SUMMARY

In one embodiment, an infrastructure management device is provided. The infrastructure management device comprises a processor configured to obtain port status and networking device status for each of one or more physicals networking devices in a system. The device also comprises a display unit coupled to the processor and configured to display one or more virtual networking devices, each virtual networking device representing one of the one or more physical networking devices based on the port status and networking device status; and a user input element configured to provide user input to the processor. The processor is configured to periodically update the port status of a first port and a second port associated with a work order. The port status indicates that a cable is inserted into the first port and the processor obtains cable data identifying one or more characteristics of the cable inserted into the first port. The processor is configured to compare the one or more characteristics of the cable inserted into the first port with one or more characteristics defined in the work order. The processor is configured to provide a notification to a user indicating whether the one or more characteristics of the inserted cable comply with the one or more characteristics defined in the work order.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
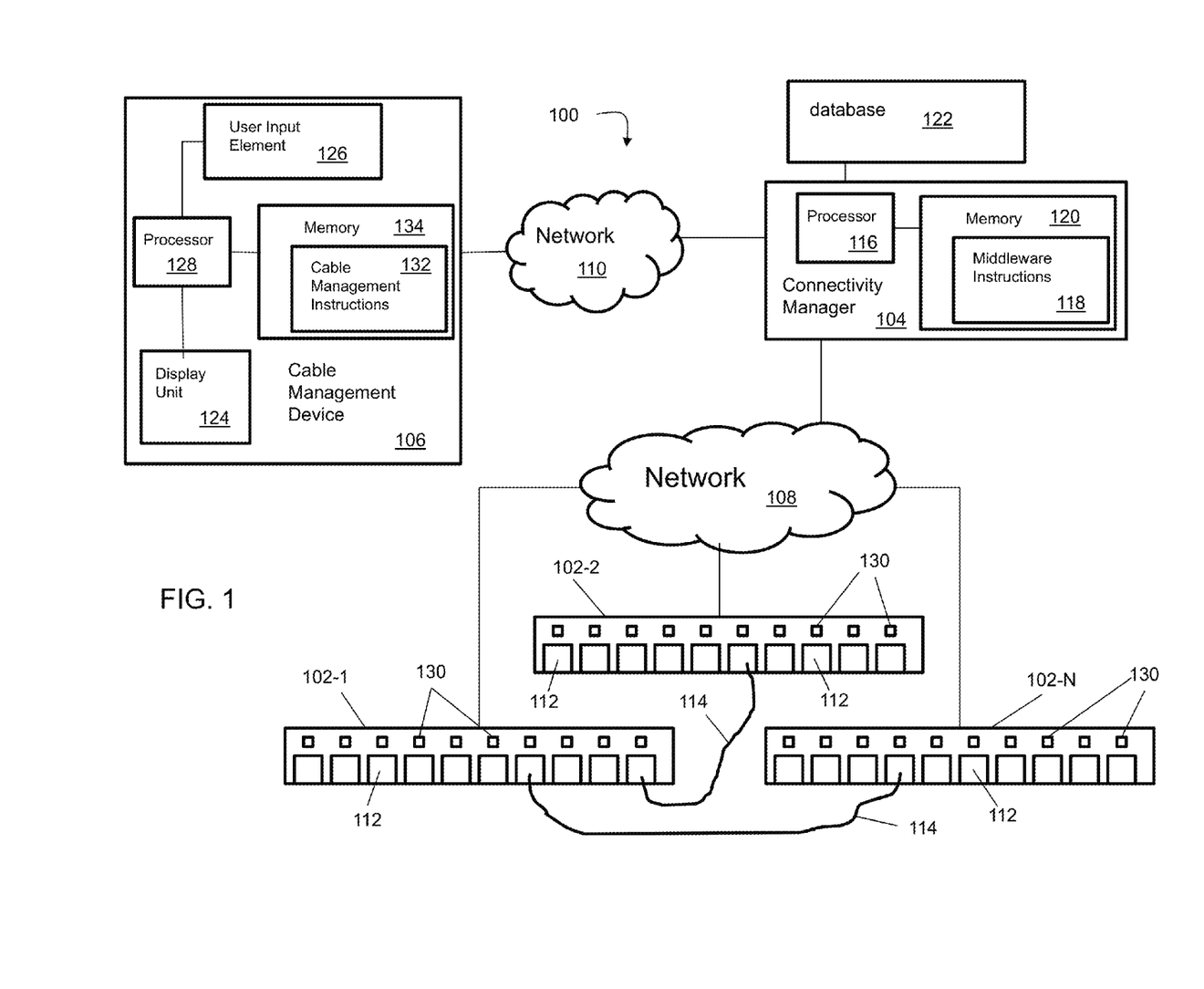
FIG. 1 is a high level block diagram of one embodiment of an infrastructure management system.

FIG. 1 is a high level block diagram of one embodiment of an exemplary system 100. System 100 includes a plurality of networking devices 102-1 . . . 102-N, a connectivity manager 104 and an infrastructure management device 106. The plurality of networking devices 102 can be implemented in a data center, for example, and is coupled to the connectivity manager 104 via a network 108. In addition, each of the plurality of networking devices 102 can be implemented as a patch panel, switch, router, bridge, or other networking device having a plurality of ports. The network 108 can be implemented as a private local area network, a wide area network, and/or a collection of public networks, such as the internet. Similarly, the infrastructure management device 106 is coupled to the connectivity manager via a network 110. The network 110 can be implemented as a local area network, a wide area network, and/or a collection of public networks such as the internet. Furthermore, in some embodiments the network 110 and the network 108 are the same network, whereas in other embodiments, networks 110 and 108 are implemented using separate networks.

In addition, the infrastructure management device 106 can be connected to the network 110 via a wired connection or a wireless connection using techniques known to one of skill in the art. Similarly, the connectivity manager 104 can be coupled to the network 108 via a wired connection or a wireless connection using techniques known to one of skill in the art.

Each of the networking devices 102 includes a plurality of ports 112. Each port 112 is configured to receive a connector end of a cable 114. Cables 114 can be implemented using optical fiber, copper wire, or any other suitable medium for use in cables. Each connector end of the cables 114 includes an embedded processor or microchip Electrically Erasable Programmable Read-Only Memory (EEPROM) which provides information regarding the respective cable 114, such as, but not limited to data regarding the cable length, cable color, cable type, or other cable characteristics, etc. For example, cables 114 can be implemented using the Connection Point Identification Technology™ (CPID) in the Quareo™ system produced by TE Connectivity. Additionally, each of networking devices 102 includes an embedded processor. The processor cards have a network port, such as an Ethernet port, that connects the networking device to other network elements, such as other panels, hubs, switches, or routers, etc.

The connectivity manager 104 connects to each of the networking devices 102 to discover the type of device and the device configuration (e.g. how many ports and type of ports), and to obtain state information for each of the ports 112 in the respective networking devices 102. In particular, the connectivity manager 104 includes a processor 116 which is configured to execute middleware instructions 118 stored on memory 120. The middleware instructions 118, when executed, enable the connectivity manager 104 to communicate with and obtain the state information from the networking devices 102. For example, the connectivity manager 104 obtains connectivity data regarding which ports 112 are coupled together and which cables 114 couple each pair of ports 112. In addition, when executed, the middleware instructions 118 cause the processor 116 to store the connectivity data in a database 122. Exemplary software suites for implementing middleware instructions 118 include, but are not limited to, TE Connectivity's Infrastructure Configuration Manager (ICM) software suite or TE Connectivity's Quareo PathManager software suite.

The infrastructure management device 106 couples to the connectivity manager 104 over the network 110 to obtain connectivity data. For example, the infrastructure management device 106 can connect to the connectivity manager 104 via a web services interface such as, but not limited to, an eXtensible Markup Language (XML)/Simple Object Access Protocol (SOAP) based messaging interface described using Web Service Description Language (WSDL) files, HyperText Markup Language (HTML), Simple Network Management Protocol (SNMP), or REpresentational State Transfer (REST). The infrastructure management device 106 can be implemented as a desktop computer, laptop computer, slate or tablet computer, wireless telephone (including so-called "smart phones"), or other handheld/mobile device.

The infrastructure management device 106 uses the connectivity data to display virtual networking devices on the display unit 124 that correspond to physical networking devices. In particular, the infrastructure management device 106 periodically queries the connectivity manager 104, such as via background processes/tasks, to continually update the display of virtual networking devices. In this way, the virtual networking devices on the display reflect changes to the corresponding physical networking devices in approximately real time. For example, if a cable is inserted into a port on the physical networking device, the corresponding virtual networking device is updated to display a cable connected to the corresponding port. This enables the user to visually inspect networking devices and see if the ports are occupied or available using the virtual networking device display on the infrastructure management device 106.

The infrastructure management device 106 also uses the connectivity data to provide notification to a user on whether or not an inserted cable 114 matches the intended cable for the respective port 112. In particular, the infrastructure management device 106 enables a user to create a work order and monitor if the work order has been completed properly as described in more detail below. To aid in the creation and monitoring of work orders, the infrastructure management device 106 uses the connectivity data to generate a virtual representation of one or more networking devices on a display unit 124. The networking devices which are displayed can be selected manually by a user or automatically by the infrastructure management device 106.

For example, in some embodiments, the display unit 124 presents the user with a choice of manual or automatic selection of networking devices. The user enters a choice of either manual or automatic selection with the user input device 126. The display unit 124 can be implemented as any suitable display element capable of rendering a visual display, such as, but not limited to, a cathode ray tube (CRT) display, an active matrix liquid crystal display (LCD), or a passive matrix LCD. The user input element 126 can be implemented with an element that is separate from the display unit 124, such as, but not limited to, a keyboard, electronic mouse, joystick, etc. Alternatively, the user input element 126 can be implemented together with the display unit 124 via a touch screen for display and input of user data.

If the user chooses automatic selection of networking devices, the infrastructure management device 106 selects the first N discovered networking devices for display, where N is the total number of networking devices to be displayed. The number of networking devices can be selected by the user in some embodiments. In other embodiments, the total number of networking devices to be displayed is predetermined and/or hard coded. For example, the total number of networking devices to be displayed can vary based on the screen size of the display unit 124.

If the user chooses manual selection of networking devices, the infrastructure management device 106 displays a list of discovered networking devices on the display unit 124. The discovered networking devices are networking devices which the infrastructure management device 106 determines are managed by the connectivity manager 104 based on connectivity data received from the connectivity manager 104. The user is then able to select which networking devices to display from the list of discovered networking devices as well as to select the order in which to display the networking devices on the display unit 124. Hence, prior to displaying the virtual networking devices, a user is able to visually select the order of display. In addition, after being displayed, the displayed networking devices can be moved/rearranged on the display unit 124 via the user input element 126.

Figure 2:
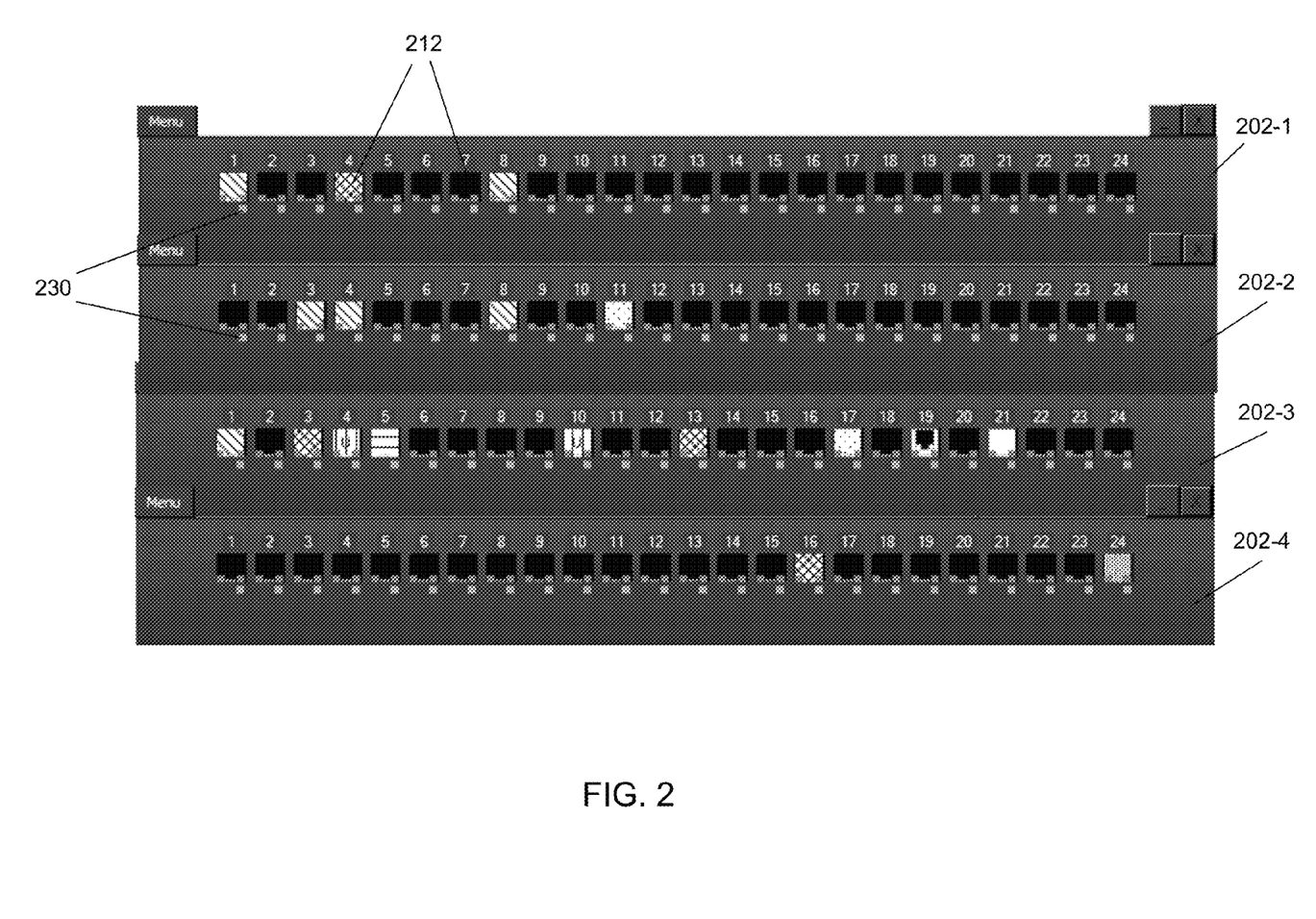
FIG. 2 is a depiction of one embodiment of an exemplary virtual networking device display.
Figure 3:
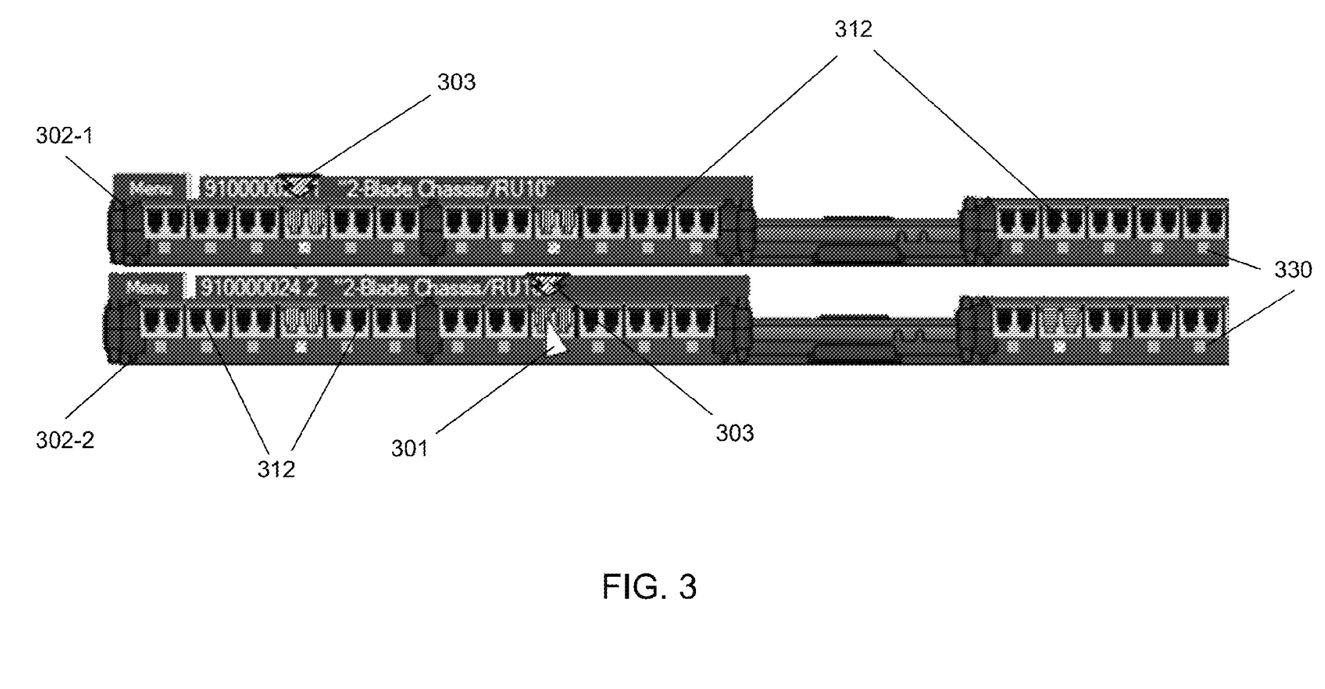
FIG. 3 is a depiction of one embodiment of another exemplary virtual networking device display.

Examples of virtual networking device displays are shown in FIGS. 2 and 3. In particular, FIG. 2 presents an exemplary display of patch panels 202 for use with copper wiring and FIG. 3 presents an exemplary display of fiber blades 302 for use with optical fiber. The networking devices 202 and 302 represent the physical networking devices used in a system such as a data center. Hence, the connectivity data retrieved from the connectivity manager 104 includes, but is not limited to, data regarding the type of networking device, number of ports, light emitting diode (LED) states, and cable information for each port which is connected to a cable.

As shown in FIGS. 2 and 3, each networking device 202, 302 is depicted to approximately match the actual appearance of the respective networking device. Each virtual networking device is uniquely identified by the device name and identifier (ID) printed on the virtual networking device, as shown in FIG. 3. In addition, each port into which a cable has been inserted displays a pattern representative of the respective cable. Although, patterns are used in this example, it is to be understood that in other embodiments, colors can be used to depict each cable. For example, the color displayed on each port can be set to approximately match the color of the cable that is inserted into the respective port. When a cable is removed, the respective port on the display unit 124 is updated so that the color/pattern is removed and reflects an empty port. When a cable is inserted, the respective port on the display unit 124 is updated to display a color/pattern associated with the inserted cable. If a cable is inserted that has not been configured to provide data regarding the cable, the display unit 124 depicts a color/pattern reserved for such unmanaged cables. For example, in the exemplary display in FIG. 2, ports 4 and 10 of panel 202-3 includes a V' which represents an unmanaged cable for which cable data is unavailable.

Figure 4:
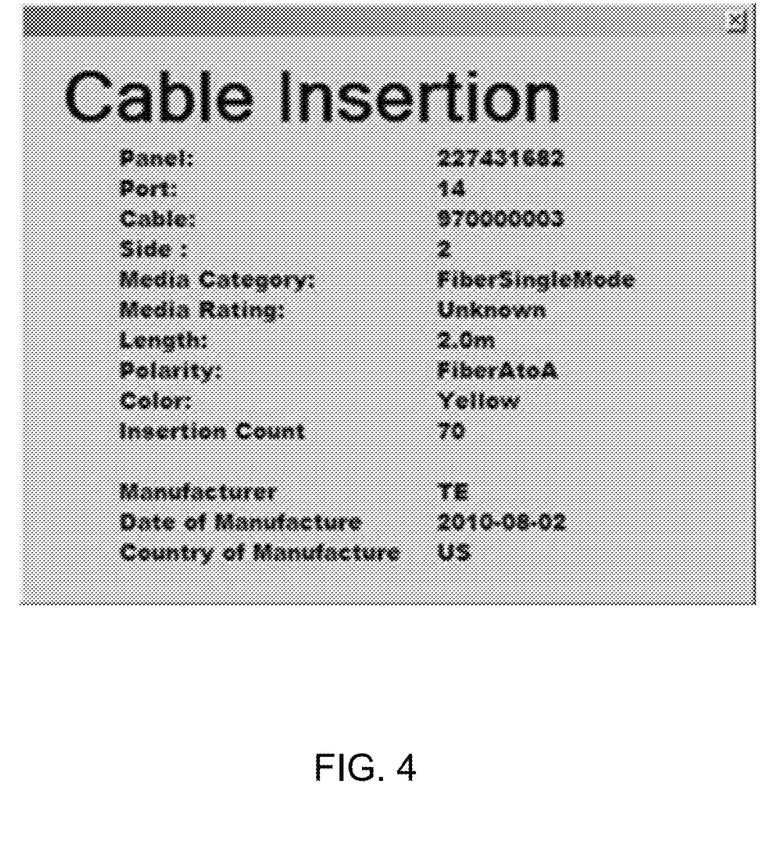
FIG. 4 is a depiction of one embodiment of an exemplary notification of cable insertion.

In addition, when cables are removed/inserted, the infrastructure management device 106 is configured, in some embodiments, to display on the display unit 124 a text notification, such as a pop-up window, which includes the information regarding the cable that has been removed or added as well as the port number and networking device ID associated with the inserted/removed cable. One exemplary notification of cable insertion is depicted in FIG. 4. It is to be understood that the notification shown in FIG. 4 is provided by way of example only and that other formats and/or information displayed can be implemented in other embodiments.

A notification, such as that shown in FIG. 4, can also be displayed when the user selects a port using the user input element 126. For example, the notification can be displayed when a user places a mouse pointer over the port and/or clicks on the port. The notification pop-up screen can be closed by clicking the close button at the top right of FIG. 4 or by selecting to hide the cable information, such as from a drop-down menu. If a port is empty (e.g. no cable), the notification screen does not appear when the port is selected. If the port has an unmanaged cable, a notification screen appears indicating that the cable is unmanaged. The unmanaged notification screen can be configured to display a different color, such as red, to indicate that the cable is unmanaged as well.

Figure 8:
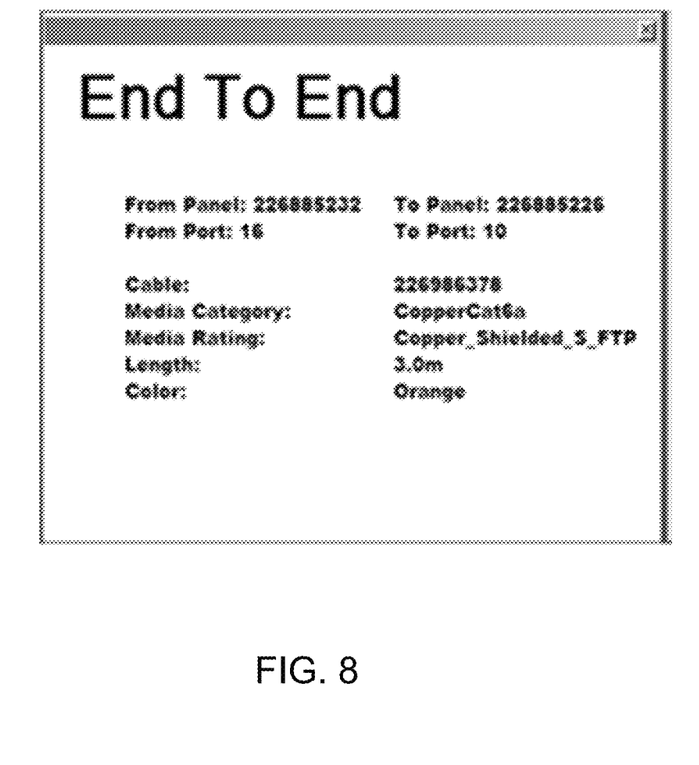
FIG. 8 is a depiction of one embodiment of an exemplary notification of an end-to-end connection.

Once both ends of a cable have been inserted into a respective port, the infrastructure management device 106 is configured, in some embodiments, to display end to end information in real time, such as in the exemplary pop-up window shown in FIG. 8. When a cable is removed, the end to end pop-up window is closed automatically if an end to end connection was present. In addition, the cable information pop-up window corresponding to the removed cable is also closed automatically if open. The infrastructure management device 106 can be configured to enable or disable the automatic display of pop-up windows. The pop-up window notifications can also be displayed and closed on demand based on user input.

In some embodiments, when a port is selected, such as through a click or hovering a pointing device over the port, the infrastructure management device 106 is configured to indicate to the user in which port the other end of the selected cable is connected. For example, as shown in FIG. 3, a mouse pointer 301 is placed over one of the ports 312 in networking device 302-2. This user action triggers the display of arrows 303. The arrows 303 indicate the ports 312 which are coupled together via a cable. It is to be understood that in place of or in addition to arrows 303, other symbols and/or a text notification, such as the exemplary notification in FIG. 8, can be displayed to indicate which ports are coupled together. When the user deselects the port, such as by moving the mouse pointer 301 such that it is no longer hovering over the port, the arrows 303 disappear. If the user hovers the mouse pointer 301 over a port for which the other end of the cable is not inserted in any port, the arrows 301 do not appear. Similarly, if the mouse pointer 301 is hovering over a port and one end of the connection is removed, the arrows 301 disappear.

Figure 5:
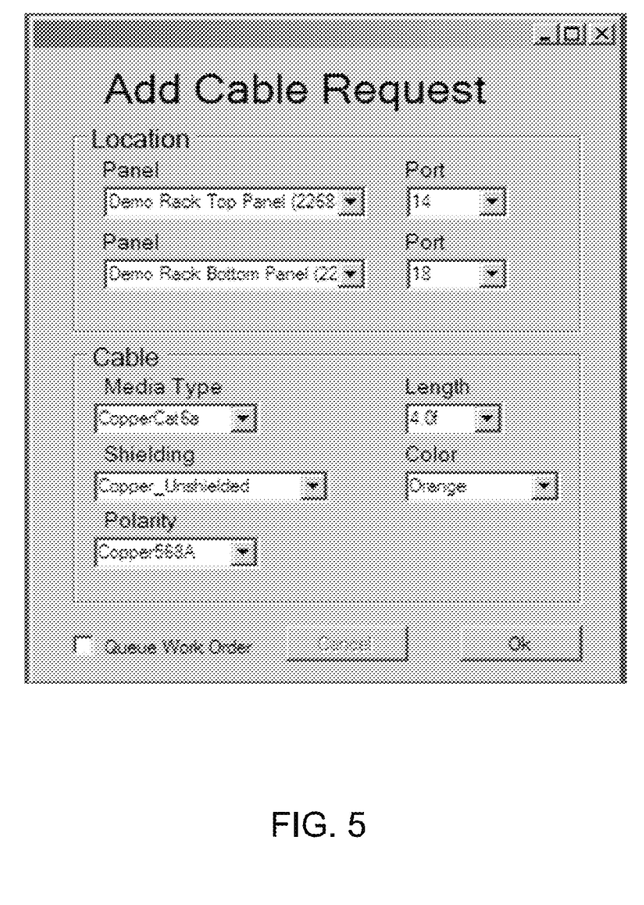
FIG. 5 is a depiction of one embodiment of an exemplary work order creation screen.

As discussed above, the infrastructure management device 106 also enables a user to enter and monitor work orders. A work order specifies specifics of the cable to be used as well as into which ports the ends of the cable are to be inserted. For example, when a user creates a work order, a screen similar to the example shown in FIG. 5 is presented on display unit 124. It is to be understood that the screen shown in FIG. 5 is presented by way of example and not by way of limitation. As shown in FIG. 5, a user is presented with options for selecting the networking device and port number for each end of the connection. In addition, the user is able to select settings for the cable to be used. In this example, the user is presented with pre-defined options/fields for the cable media type, cable shielding, cable polarity, cable length, and cable color. However, it is to be understood that in other embodiments, different options and/or a different number of options is available for the user. In addition, in this example, a user selects from a predetermined set of values for each options. However, in other embodiments, the user is able to enter a value directly rather than select from a predefined list. The fields, thus, define characteristics of a cable to be inserted in the respective ports of the work order.

In some embodiments, each field must be completed in order to save the work order. In other embodiments, one or more fields are optional. In such embodiments, if an optional field is left blank, the infrastructure management device 106 accepts any value for that field when determining if the work order has been fulfilled. In addition, it is to be understood that although the options for each field are presented as a drop down menu in this example, other formats, such as radio button or free-form text, can be used in other embodiments.

Additionally, in the embodiment shown in FIG. 5, an option is presented to queue the work order. When work orders are queued, the infrastructure management device 106 processes the work orders in sequential order. That is, after the first work order is fulfilled, the infrastructure management device 106 processes the next work order, etc. If the work orders are not queued, the infrastructure management device 106 processes the work orders in parallel. That is, the infrastructure management device 106 processes each of the saved work orders that are not queued at the same time.

When a work order is processed by the infrastructure management device 106, the processor 128 instantiates a task associated with the work order. A new task (also referred to as a thread) is instantiated for each work order when the work order is processed. Thus, if three work orders are processed in parallel, for example, three tasks are instantiated, respectively. For each respective work order, the task queries the connectivity manager 104 for events relevant to the work order, such as cable insertion, cable removal, networking device enable, or networking device disable. In addition, the task filters the events for those specific to the networking devices and ports specified in the work order. When a query returns a cable insertion event relevant to the work order, the task obtains the connectivity data for the cable associated with the event (e.g. cable ID, cable color, cable length, etc.).

The processor 128 then compares the connectivity data with the characteristics of the intended cable defined by the work order. When both ends of a cable have been inserted into the ports of the work order and the characteristics of the cable match the characteristics of the work order, the processor 128 determines that the work order has been fulfilled. In some embodiments, a text notification is optionally provided to the user via the display unit 124 which indicates that the work order has been fulfilled. In addition, in some embodiments, the processor 128 can provide control signals to the actual networking devices 102 which cause an LED 130 associated with the respective ports 112 to illuminate a color which indicates a correct coupling. For example, the LED 130 can be set to illuminate a green color to indicate a correct coupling. In addition, in some embodiments, the virtual networking devices on the display 124 can be configured with elements 230, 330 representative of the physical LEDs 130. In such embodiments, the virtual LEDs 230, 330 are changed to display the same color and/or flashing cadence/periodicity as the physical LED 130. In some embodiments, the infrastructure management device 106 is also configured to permit a user to manually set/change the physical LEDs 130 and/or the virtual LEDs 230/330 via the user input element 126. For example, through mouse clicks on the virtual LEDs 230/330, the virtual LEDs 230/330 can cycle through options and the infrastructure management device 106 sends control signals to the corresponding physical networking device 102 such that the corresponding physical LED 130 also changes in accordance with the virtual LED 230/330.

Figure 6:
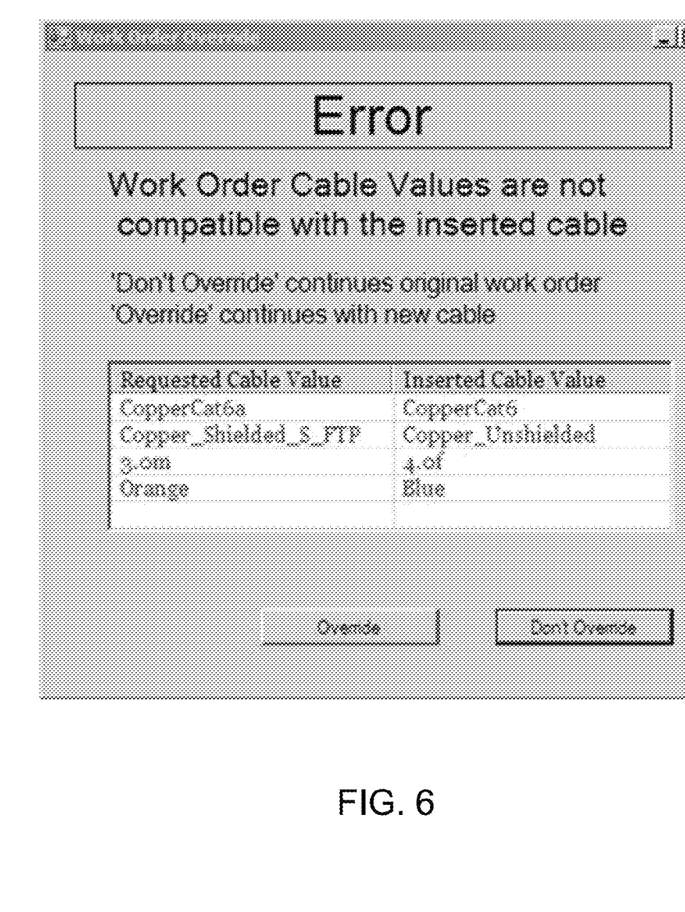
FIG. 6 is a depiction of one embodiment of an exemplary notification of a cable mismatch.

If the characteristics do not match, the processor 128 causes the display unit 124 to display a notification that the inserted cable does not comply with the work order. One such exemplary notice is depicted in FIG. 6. In addition, in some embodiments, the physical LEDs 130 and virtual LEDs 230, 330 can be configured to illuminate a color indicative of an incorrect coupling. For example, the LEDs can be configured to illuminate a red color.

In addition, when a cable has been correctly inserted into one port of a work order, but the other end of the cable is inserted into the wrong port, the infrastructure management device 106 is able to detect the misplacement of the other end of the cable through the task which monitors all ports for cable insertion/removal events, as discussed above. Such a misplacement can be detected by comparison of the cable ID. When such a misplacement is detected a notification can be provided which indicates both the incorrect port into which the cable end is inserted as well as the port into which the cable end should be inserted. The virtual and physical LED can also be set to guide the user in locating the misplaced cable end and inserting it into the correct port. Once the cable is removed from the incorrect port, the notification indicating an error is automatically removed in some embodiments.

Additional details regarding monitoring a work flow are described in more detail below. Through the use of work flows, the infrastructure management device 106 is able to alert a user in real time if an inserted cable does not comply with a predetermined work order. In some embodiments, as shown in FIG. 6, the user is also presented with an option to override the work order when the inserted cable does not match the characteristics specified in the work order. Thus, the user can accept the inserted cable. When the work order is overridden, the processor 128 is configured to set the LEDs to the color indicative of a correct coupling in embodiments implementing physical and/or virtual LEDs.

Figure 9:
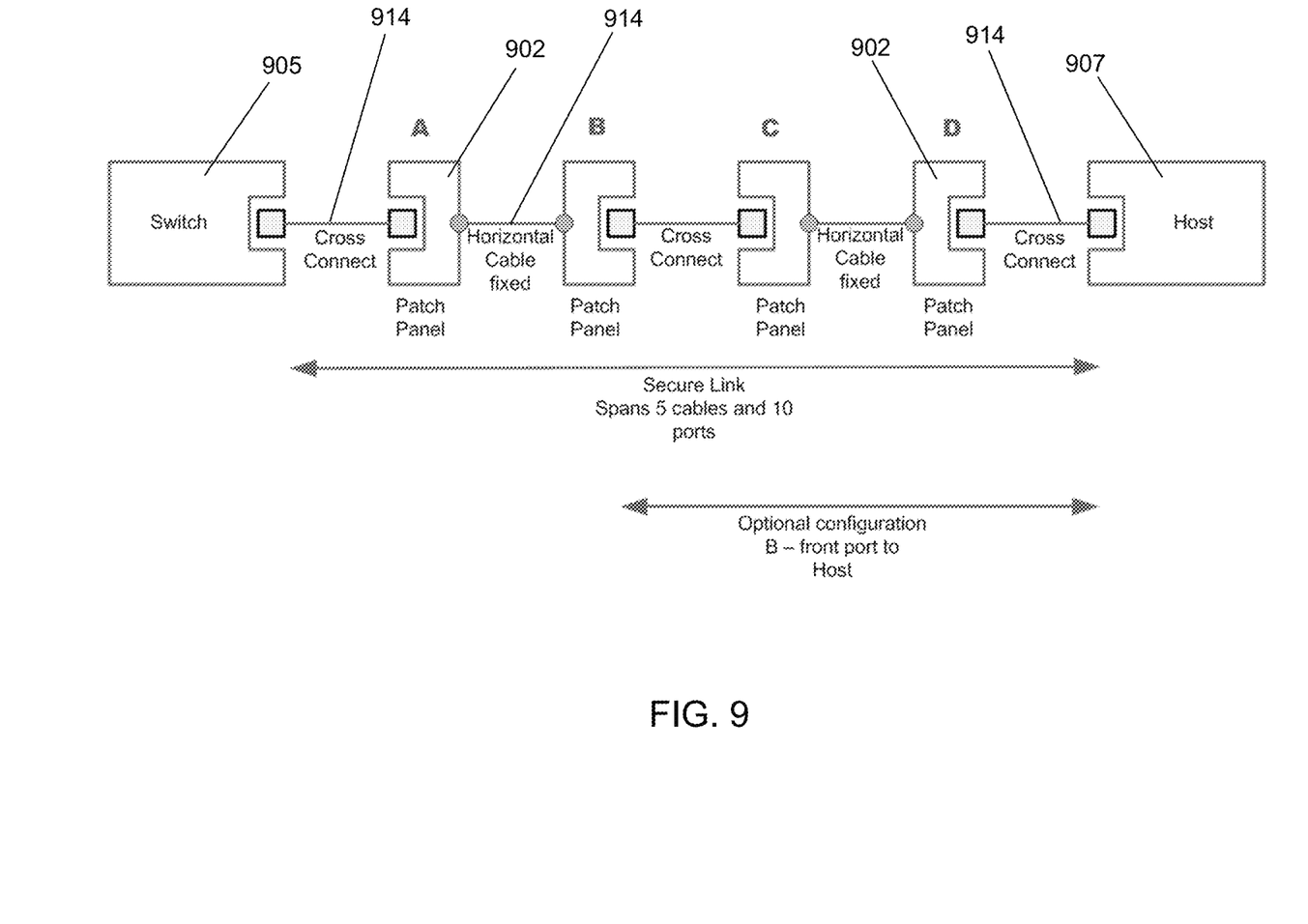
FIG. 9 is a block diagram depicting one exemplary link.

Additionally, the infrastructure management device 106 can be configured in some embodiments to create and monitor secure links. In particular, a user can create a secure link once a link between two points has been established. For example, FIG. 9 is a block diagram depicting one exemplary link between switch 905 and a host device 907. Between switch 905 and host device 907 are a plurality of other networking devices 912. In particular, in this example, there are four patch panels. The secure link can be configured to start and end at any point between the host device 907 and the switch 905. For example, the secure link can be configured to include all connections between host device 907 and 905 or all connections between host device 907 and one of the patch panels 912. Each networking device 912, host device 907, and switch 905 is coupled to another device via a cable 914. Each cable 914 can be implemented using copper, fiber, or other conductive medium. Each cable 914 does not need to be the same.

The infrastructure management device 106 can be configured to discover the complete end to end connection for the link based on the received connectivity data. The end to end connection along with the intermediate connection can be displayed to a user on the display unit 124. After a user selects the start and end points for the secure link, the processor 128 instantiates a task which periodically queries the connectivity manager 104 for events related to a cable removal from one of the ports associated with the secure link. In some embodiments, the user manually selects the start and end points for the secure link. In other embodiments, the user can select a single port along the link path and the processor 128 automatically computes the entire span of the link. The periodicity of the queries is set high enough that the detection of a cable removal is performed approximately in real time.

If the cable is removed from one of the ports associated with the secure link, the processor 128 provides an indication of the removal to a user. For example, the light of the LED can be changed, a text notification can be presented on the display unit 124, etc. Additionally, in some embodiments, when the secure link is created, the user can enter one or more email addresses and/or one or more phone numbers. When the cable removal is detected, the processor 128 causes an email to be sent to the one or more email addresses and/or a phone call to be placed to the one or more phone numbers. In this way, any removal of the cable from a secure link triggers an alert for the user. In order to restore the secure link, in some embodiments, a cable having the same unique ID as the cable removed must be inserted. In other embodiments, a cable having the same characteristics, but a different unique ID, can be inserted to restore the secure link. In some embodiments, a notification can be displayed and/or sent via email or phone which indicates that the link has gone down and a separate notification can be displayed and/or sent via email or phone which identifies the port. A separate notification is then sent for each port that is disconnected. In addition, in some embodiments, when a port is reconnected with the same or acceptable cable, another notification is sent for each port indicating it is no longer down. When all ports have been acceptably reconnected, another notification indicating that the secure link is back up is then provided.

It is to be understood that the processor 128 includes or functions with software programs, firmware or other computer readable instructions for carrying out various methods, process tasks, calculations, and control functions, used in the processing of work orders.

These instructions, labeled as infrastructure management instructions 132, are typically stored on any appropriate computer readable medium, such as memory 134, used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 7:
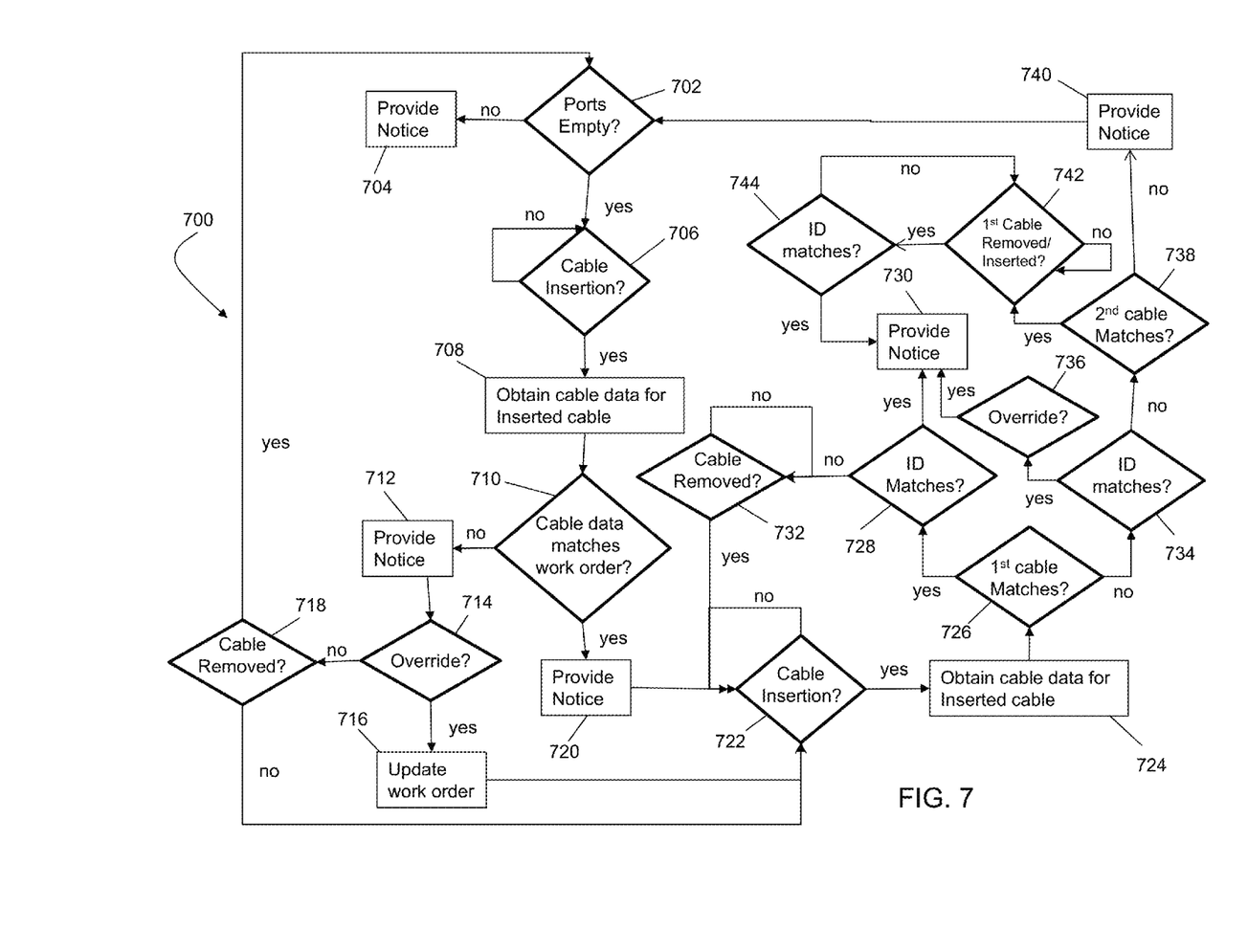
FIG. 7 is a flow chart of one embodiment of a method of processing a work order.

FIG. 7 is a flow chart depicting an exemplary method 700 of processing a work order. Method 700 can be implemented by a processor such as processor 128 executing instructions such as infrastructure management instructions 132 stored on memory 134 shown in FIG. 1. At block 702, it is determined if a first port and/or a second port of a work order are empty. As used herein, a port is empty if no cable end has been inserted into the port. If one or both of the first and second ports are not empty, a notification is provided to a user at block 704. For example, a text notification can be displayed on a display unit, such as display unit 124. In addition, a physical LED on the networking device corresponding to the port which is not empty can be set to a color and flash periodicity indicative of an error. For example, the LED can be set to flash amber quickly. A virtual LED on a display which represents the corresponding networking devices/ports can also be set to the same color and flash periodicity as the physical LED in some embodiments. This check to determine if a port is already occupied can also be performed when a user selects a networking device and port while creating the work order.

At 706, if the both the first port and second port are empty, the port status is monitored for a cable insertion. For example, in some embodiments, a task is created which periodically queries a connectivity manager, which communicates with the networking devices, to determine when a cable has been inserted into a port. In addition, the physical LEDs and/or virtual LEDs associated with the first port and the second port can be set to a color and flash periodicity to guide the user where to insert the cables at the physical networking devices. When a cable insertion is detected at the first port, the cable data, such as the cable ID, cable, length, etc. are passed to the infrastructure management device at block 708. If no cable data is available, e.g. a standard unmanaged cable is inserted, this fact is indicated to the work order processor. The infrastructure management device compares the received cable data to the characteristics defined in the work order at block 710.

If one or more of the characteristics do not match, a notification is provided to the user at block 712. For example, a text notification can be provided on the display unit. In some implementations, the text notification includes both the cable data for the inserted cable as well as the characteristics specified by the work order. In addition, in some embodiments, the physical and/or virtual LEDs can be set to provide a visual indication of the mismatch, such as, but not limited to, a color and flash periodicity indicating a mismatch. For example, in one embodiment a fast flashing amber light indicates a mismatch. Optionally, at block 714, an option is presented to the user on the display unit to override the detected mismatch. If the option to override is not provided, then the work order cannot be completed until removal of the cable in the first port is detected and a cable matching the work order is inserted.

If the mismatch is overridden, the work order is updated with the characteristics of the inserted cable at block 716. Additionally, if the mismatch is overridden, the color and flash periodicity is changed to indicate that the cable complies with the work order. If the mismatch is not overridden, it is determined if the cable has been removed from the first port at block 718. If the cable has been removed, the process returns to block 702 where it is determined that both ports are empty. If the cable is not removed from the first port at block 718, the process may continue to block 722 where it is determined if a cable is inserted into the second port.

If each of the characteristics of the cable inserted in the first port matches the characteristics defined in the work order at block 710, a notification that the cable complies with the work order is provided at block 720. For example, a text notification can be provided on the display unit and/or the physical and/or virtual LEDs can be set to a color and flash periodicity indicative of a match. For example, in one embodiment a solid green light indicates a match. In some embodiments only the LEDs associated with the first port into which the cable has been asserted are set for either a match or a mismatch.

At block 722, when a cable insertion in the second port is detected, the cable data, such as the cable ID, cable, length, etc. of the cable inserted into the second port are passed to the infrastructure management device at block 724. The infrastructure management device compares the received cable data to the characteristics defined in the work order at block 724. At block 726, it is determined if the first cable complied with the work order characteristics. If the first cable complied with the work order, then the cable ID of the cable inserted into the second port is compared to the cable ID of the cable inserted into the first port at block 728. If the cable IDs match, then it is determined that it is the same cable and, therefore, the cable inserted into the second port complies with the work order. A notification is then provided at block 730 that the work order has been completed. For example, a text notification can be provided on the display unit and/or the physical and/or virtual LEDs can be set to a color and flash periodicity indicative of a completed work order. In particular, the text notification indicates that the work order has been completed. Similarly, the LEDs associated with both ports are set to solid green, for example, to indicate that the work order has been completed If the cable IDs do not match at block 728, it is determined when the cable inserted into the second port has been removed at block 732. Once the cable has been removed from the second port, the method 700 continues at block 722. Although not shown, it is to be understood that the first port is continually monitored to determine if the cable has been removed. If it is removed, the method 700 would return to block 702 to begin again.

If it is determined that the cable inserted in the first port did not match the work order characteristics, it is determined if the cable IDs of the cable inserted into the first port and the second port match at block 734. If the cable IDs match, an optional decision to override the work order is again provided to the user in some embodiments, at block 736. If the work order is overridden, the work order is updated and notification that work order has been completed is provided at block 730.

If the cable IDs do not match at block 734, it is determined if the characteristics of the cable inserted into the second port match the characteristics defined in the work order at block 738. If the characteristics of the cable inserted into the second port do not match the work order, notice is provided at block 740, as described above, and the method 700 returns to block 702 until it is determined that the cables inserted into the first and second ports are removed.

If the cable inserted into the second port matches the work order at block 738, method 700 proceeds to block 742, where it is determined when the cable inserted in the first port has been removed and another cable has been inserted. When another cable has been inserted into the first port, it is determined at block 744 if the cable ID of the cable inserted into the first port matches the cable ID of the cable inserted into the second port. If the cable IDs match, it is determined that the same cable which complies with the work order has been inserted into the first port and the notification is provided at block 730. If the cable IDs do not match at block 744, method 700 returns to block 742. Although not shown, it is to be understood that the second port is continually monitored to determine if the cable inserted in the second port has been removed. If it is removed, the method 700 would return to block 702 to begin again.

Although specific embodiments have been illustrated and described herein, it will be appreciated by those of ordinary skill in the art that any arrangement, which is calculated to achieve the same purpose, may be substituted for the specific embodiments shown. For example, although the infrastructure management device and connectivity manager are depicted as separate devices in the embodiment of FIG. 1, it is to be understood that that the functions of the respective devices can be implemented in a single device in other embodiments. Therefore, it is manifestly intended that this invention be limited only by the claims and the equivalents thereof.

What is claimed is:

1. An infrastructure management system comprising:
   a plurality of networking devices, each networking device having a plurality of ports;
   a connectivity manager coupled to each of the plurality of networking devices via a first network, wherein the connectivity manager is configured to communicate with the plurality of networking devices to obtain status of each of the networking devices and port status of each of the plurality of ports;
   a database coupled to the connectivity manager and configured to store the port status and networking device status obtained by the connectivity manager;
   an infrastructure management device coupled to the connectivity manager via a second network, wherein the infrastructure management device is configured to communicate with the connectivity manager to obtain the port status and networking device status of the plurality of ports;
   wherein the infrastructure management device is configured to display one or more virtual networking devices based on the obtained port status and networking device status, each virtual networking device representing one of the plurality of networking devices;
   wherein the infrastructure management device is further configured to monitor the port status of a first port and a second port corresponding to a work order, the work order defining one or more characteristics of a desired cable to couple the first port to the second port;
   wherein when the infrastructure management device determines that one end of a cable is inserted into the first port, the infrastructure management device obtains cable data from the connectivity manager, the cable data including one or more characteristics of the cable inserted into the first port;
   wherein the infrastructure management device compares the one or more characteristics of the inserted cable with the corresponding one or more characteristics of the desired cable defined by the work order and provides a notification to a user indicating whether or not the one or more characteristics of the inserted cable match the one or more characteristics defined by the work order.

2. The system of claim 1, wherein the infrastructure management device is configured to display a textual message which indicates whether or not the one or more characteristics of the inserted cable match the one or more characteristics of the work order.

3. The system of claim 1, wherein the infrastructure management device causes a light emitting diode (LED) which corresponds to the first port on the networking device to change color, the color indicative of a whether or not the one or more characteristics of the inserted cable match the one or more characteristics of the work order.

4. The system of claim 3, wherein the infrastructure management device causes a virtual LED on the virtual networking device to change color, the virtual LED corresponding to the virtual port that represents the first port and the color matching the color of the LED corresponding to the first port.

5. The system of claim 1, wherein, when the one or more characteristics of the cable inserted into the first port do not match the one or more characteristics defined by the work order, the infrastructure management device is configured to request user input to override the work order; and
   when user input indicating that the work order is to be overridden, the infrastructure management device is configured to update the work order with the one or more characteristics of the cable inserted into the first port.

6. The system of claim 1, wherein the infrastructure management device is configured to monitor a link consisting of two ports coupled to one another via a cable, wherein if the cable is removed from one of the two ports, the infrastructure management device is configured to produce an alert indicating that the cable has been removed.

7. The system of claim 6, wherein the infrastructure management device is configured to provide the alert to one or more users via an email or an automated phone call.

8. An infrastructure management device comprising:
   a processor configured to obtain port status and networking device status for each of one or more physical networking devices in a system;
   a display unit coupled to the processor and configured to display one or more virtual networking devices, each virtual networking device representing one of the one or more physical networking devices based on the port status and networking device status;
   a user input element configured to provide user input to the processor;
   wherein the processor is configured to periodically update the port status of a first port and a second port associated with a work order;
   when the port status indicates that a cable is inserted into the first port, the processor obtains cable data identifying one or more characteristics of the cable inserted into the first port;
   wherein the processor is configured to compare the one or more characteristics of the cable inserted into the first port with one or more characteristics defined in the work order;
   wherein the processor is configured to provide a notification to a user indicating whether the one or more characteristics of the inserted cable comply with the one or more characteristics defined in the work order.

9. The infrastructure management device of claim 8, wherein the processor is configured to cause the display unit to display a textual message which indicates whether or not the one or more characteristics of the inserted cable comply with the one or more characteristics defined in the work order.

10. The infrastructure management device of claim 8, wherein the processor is configured to output a control signal that causes a light emitting diode (LED) on the networking device which corresponds to the first port to change color, the color being indicative of a whether or not the one or more characteristics of the inserted cable comply with the one or more characteristics defined in the work order.

11. The infrastructure management device of claim 10, wherein the processor causes the display unit to change a color of a virtual LED on the virtual networking device, the virtual LED corresponding to the virtual port that represents the first port and the color matching the color of the LED corresponding to the first port.

12. The infrastructure management device of claim 8, wherein, when the one or more characteristics of the cable inserted into the first port do not comply with the one or more characteristics defined in the work order, the processor is configured to cause the display unit to display a request for user input to override the work order; and
when the user input element receives user input indicating that the work order is to be overridden, the processor is configured to update the work order with the one or more characteristics of the cable inserted into the first port.

13. The infrastructure management device of claim 8, wherein the processor is configured to monitor a link comprising at least two ports coupled to one another via a cable, wherein if the cable is removed from one of the at least two ports, the processor is configured to output an alert indicating that the cable has been removed from the respective port.

14. The infrastructure management device of claim 13, wherein the processor is configured to output the alert to one or more users via an email or an automated phone call.

15. A method of processing a work order, the method comprising:
displaying one or more virtual networking devices on a display unit, each virtual networking device representing one or more physical networking devices;
monitoring port status of a first port and a second port associated with the work order to determine when a cable is inserted into the first port or the second port;
when the cable is inserted into the first port, obtaining one or more characteristics of the cable inserted into the first port;
comparing the one or more characteristics of the cable inserted into the first port with one or more corresponding characteristics defined in the work order; and
if at least one of the one or more characteristics of the cable inserted into the first port does not match the corresponding characteristic defined in the work order, displaying an indication of a mismatch on a display unit.

16. The method of claim 15, wherein if at least one of the one or more characteristics of the cable inserted into the first port does not match the corresponding characteristic defined in the work order, changing a physical light emitting diode (LED) associated with the first port on a networking device to indicate the mismatch.

17. The method of claim 16, further comprising changing a color of a virtual LED on a virtual networking device displayed on the display unit to match the color of the physical LED, the virtual LED associated with a virtual port that represents the first port.

18. The method of claim 15, further comprising, if at least one of the one or more characteristics of the cable inserted into the first port does not match the corresponding characteristic defined in the work order, displaying a request for user input to override the work order; and
when user input indicates that the work order is to be overridden, updating the work order with the one or more characteristics of the cable inserted into the first port.

19. The method of claim 15, further comprising:
obtaining one or more characteristics of a cable inserted into the second port;
comparing a cable identification number of the cable inserted into the first port with a cable identification number of the cable inserted into the second port;
if the cable identification number of the cable inserted into the first port matches a cable identification number of the cable inserted into the second port and the one or more characteristics of the cable inserted into the first port match the corresponding characteristics defined in the work order, displaying a notification on the display unit that the work order has been completed.

20. A program product comprising a processor-readable medium on which program instructions are embodied, wherein the program instructions are configured, when executed by at least one programmable processor, to cause the at least one programmable processor to:
output commands to a display unit to display one or more virtual networking devices, each virtual networking device representing one or more physical networking devices;
obtain port status of a first port and a second port associated with a work order;
determine when a cable is inserted into the first port based on the port status;
obtain one or more characteristics of the cable inserted into the first port when the cable is inserted into the first port;
compare the one or more characteristics of the cable inserted into the first port with one or more corresponding characteristics defined in the work order; and
if at least one of the one or more characteristics of the cable inserted into the first port does not match the corresponding characteristic defined in the work order, output control signal to a display unit to cause the display unit to display an indication of a mismatch.

21. The program product of claim 20, wherein the program instructions are further configured to cause the at least one programmable processor to output a control signal to change a physical light emitting diode (LED) associated with the first port on a networking device to indicate the mismatch if at least one of the one or more characteristics of the cable inserted into the first port does not match the corresponding characteristic defined in the work order.

22. The program product of claim 21, wherein the program instructions are further configured to cause the at least one programmable processor to output a control signal to the display unit to change a color of a virtual LED on a virtual networking device displayed on the display unit to match the color of the physical LED, the virtual LED associated with a virtual port that represents the first port.

23. The program product of claim 20, wherein the program instructions are further configured to cause the at least one programmable processor to output a control signal to the display unit to display a request for user input to override the work order if at least one of the one or more characteristics of the cable inserted into the first port does not match the corresponding characteristic defined in the work order; and
to update the work order with the one or more characteristics of the cable inserted into the first port when user input indicates that the work order is to be overridden.

24. The program product of claim 20, wherein the program instructions are further configured to cause the at least one programmable processor to:
obtain one or more characteristics of a cable inserted into the second port;
compare a cable identification number of the cable inserted into the first port with a cable identification number of the cable inserted into the second port; and
if the cable identification number of the cable inserted into the first port matches a cable identification number of the cable inserted into the second port and the one or more characteristics of the cable inserted into the first port match the corresponding characteristics defined in the work order, output a control signal to the display unit to display a notification that the work order has been completed.

\* \* \* \* \*